United States Patent
Hirao et al.

(10) Patent No.: US 11,498,503 B2
(45) Date of Patent: Nov. 15, 2022

(54) VEHICLE AIRBAG DEVICE, CONTROL METHOD FOR VEHICLE AIRBAG DEVICE, AND STORAGE MEDIUM

(71) Applicants: Toyota Jidosha Kabushiki Kaisha, Toyota Aichi-ken (JP); Toyoda Gosei Co., Ltd., Kiyosu Aichi-Ken (JP)

(72) Inventors: Yusuke Hirao, Toyota (JP); Yasuaki Kosugi, Toyota (JP); Atsushi Murakami, Kiyosu (JP); Ikuo Yamada, Kiyosu (JP)

(73) Assignees: TOYOTA JIDOSHA KABUSHIKI KAISHA, Toyota (JP); TOYODA GOSEI CO., LTD., Kiyosu (JP)

(*) Notice: Subject to any disclaimer, the term of this patent is extended or adjusted under 35 U.S.C. 154(b) by 343 days.

(21) Appl. No.: 16/801,692

(22) Filed: Feb. 26, 2020

(65) Prior Publication Data
US 2020/0282934 A1    Sep. 10, 2020

(30) Foreign Application Priority Data
Mar. 7, 2019    (JP) .............................. JP2019-041283

(51) Int. Cl.
*B60R 21/01*  (2006.01)
*B60R 21/264*  (2006.01)
(Continued)

(52) U.S. Cl.
CPC ............ *B60R 21/01* (2013.01); *B60R 21/231* (2013.01); *B60R 21/233* (2013.01);
(Continued)

(58) Field of Classification Search
CPC .... B60R 2021/0009; B60R 2021/0023; B60R 2021/01231; B60R 21/01; B60R 21/205;
(Continued)

(56) References Cited

U.S. PATENT DOCUMENTS 5,995,892 A * 11/1999 Kiribayashi ...... B60R 21/01332
                                                        701/45
6,167,335 A * 12/2000 Ide ...................... B60R 21/0133
                                                        701/45
(Continued)

FOREIGN PATENT DOCUMENTS

JP    2016020104 A  *  2/2016
JP    2017-087848 A    5/2017
(Continued)

*Primary Examiner* — Laura Freedman
(74) *Attorney, Agent, or Firm* — Dinsmore & Shohl LLP

(57) ABSTRACT

A vehicle airbag device includes: an inflator configured to generate gas when a first squib and a second squib are fired, respectively; an airbag including a main bag portion configured to inflate and deploy between an occupant seated in a passenger seat and an instrument panel and between the occupant and a windshield when the gas generated by the inflator is supplied into the airbag, and a center bag portion configured to project between the passenger seat and a driver seat from the main bag portion; and a controlling portion configured to control the inflator such that, when a head-on collision occurs, the second squib is fired after the first squib is fired, and when an oblique collision occurs, the second squib is fired after the first squib is fired and at a timing earlier than that when the head-on collision occurs.

9 Claims, 3 Drawing Sheets

(51) Int. Cl.
    *B60R 21/231* (2011.01)
    *B60R 21/233* (2006.01)
    *B60R 21/16* (2006.01)
    *B60R 21/00* (2006.01)
(52) U.S. Cl.
    CPC .... B60R 21/264 (2013.01); *B60R 2021/0004* (2013.01); *B60R 2021/006* (2013.01); *B60R 2021/0009* (2013.01); *B60R 2021/01231* (2013.01); *B60R 2021/01286* (2013.01); *B60R 2021/161* (2013.01); *B60R 2021/23308* (2013.01)
(58) Field of Classification Search
    CPC ... B60R 21/231; B60R 21/233; B60R 21/264; B60R 2021/0004; B60R 2021/006; B60R 2021/01286; B60R 2021/161; B60R 2021/23161; B60R 2021/23308; B60R 2021/2633
    See application file for complete search history.

(56) References Cited

U.S. PATENT DOCUMENTS

| | | | |
|---|---|---|---|
| 7,104,354 B2 * | 9/2006 | Ozaki | B60R 21/0136 180/282 |
| 9,150,186 B1 * | 10/2015 | Belwafa | B60R 21/205 |
| 9,162,645 B2 * | 10/2015 | Cho | B60R 21/233 |
| 9,180,834 B1 * | 11/2015 | Le | B60R 21/203 |
| 9,333,940 B2 * | 5/2016 | Hicken | B60R 21/231 |
| 9,434,344 B2 * | 9/2016 | Fukawatase | B60R 21/2338 |
| 9,550,465 B1 * | 1/2017 | El-Jawahri | B60R 21/0134 |
| 9,561,774 B2 * | 2/2017 | Cheng | B60R 21/239 |
| 9,676,355 B2 * | 6/2017 | Kruse | B60R 21/2338 |
| 9,758,121 B2 * | 9/2017 | Paxton | B60R 21/205 |
| 9,771,047 B2 * | 9/2017 | Kruse | B60R 21/0136 |
| 9,840,223 B2 * | 12/2017 | Choi | B60R 21/2338 |
| 9,908,496 B2 * | 3/2018 | Choi | B60R 21/0136 |
| 9,956,937 B2 * | 5/2018 | Jindal | B60R 21/231 |
| 10,011,243 B2 * | 7/2018 | Patel | B60R 21/01552 |
| 10,214,174 B2 * | 2/2019 | Zhang | B60R 21/205 |
| 10,246,042 B2 * | 4/2019 | Sumiya | B60R 21/203 |
| 10,328,884 B2 * | 6/2019 | Kobayashi | B60R 21/231 |
| 10,479,316 B2 * | 11/2019 | Shin | B60R 21/217 |
| 10,589,705 B2 * | 3/2020 | O'Connor | B60R 21/01554 |
| 10,730,472 B2 * | 8/2020 | Perez | B60R 21/233 |
| 10,988,103 B2 * | 4/2021 | Oh | B60R 21/04 |
| 11,072,305 B2 * | 7/2021 | Yamazaki | B60R 21/233 |
| 2017/0355346 A1 | 12/2017 | Kobayashi | |
| 2018/0065581 A1 | 3/2018 | Ohno et al. | |
| 2018/0208143 A1 * | 7/2018 | Fischer | B60R 21/205 |

FOREIGN PATENT DOCUMENTS

| | | |
|---|---|---|
| JP | 2017-222185 A | 12/2017 |
| JP | 2018-039431 A | 3/2018 |

* cited by examiner

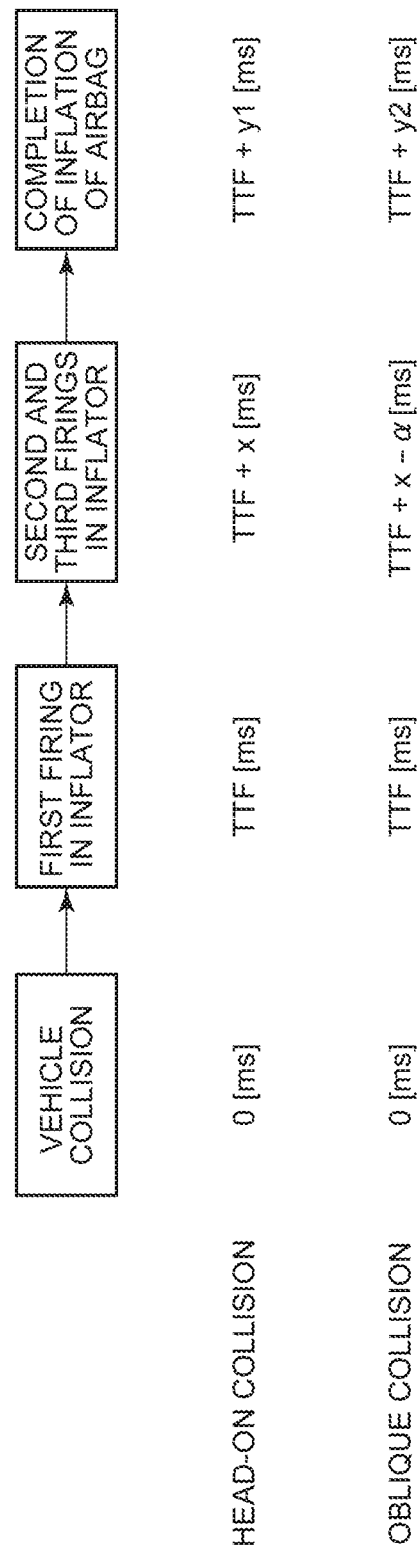

VEHICLE AIRBAG DEVICE, CONTROL METHOD FOR VEHICLE AIRBAG DEVICE, AND STORAGE MEDIUM

CROSS-REFERENCE TO RELATED APPLICATIONS

This application claims priority to Japanese Patent Application No. 2019-041283 filed on Mar. 7, 2019, which is incorporated herein by reference in its entirety including the specification, drawings and abstract.

BACKGROUND

1. Technical Field

The present disclosure relates to a vehicle airbag device, a control method for a vehicle airbag device, and a storage medium.

2. Description of Related Art

Japanese Unexamined Patent Application Publication No. 2018-039431 (JP 2018-039431 A) describes a vehicle airbag device configured to restrict an occupant seated in a passenger seat at the time of a front collision of a vehicle. In the vehicle airbag device described in JP 2018-039431 A, firing timings of a plurality of inflators are controlled such that a peak of internal pressure of an airbag at the time of an oblique collision or a small overlap collision is delayed as compared with a peak of internal pressure of the airbag at the time of a head-on collision. This makes it possible to restrict the body of the occupant by appropriate internal pressure of the airbag in accordance with a difference in type of collision.

SUMMARY

However, the following fact has been found by various impact tests. That is, when the firing timings of the inflators at the time of an oblique collision are delayed as compared with those at the time of a head-on collision, the airbag is displaced in the vehicle width direction in the oblique collision, so that restraining performance on the body of the occupant by the airbag cannot be sufficiently demonstrated, in some cases.

The present disclosure provides a vehicle airbag device, a control method for a vehicle airbag device, and a storage medium each of which can restrain displacement of an airbag in the vehicle width direction at the time of an oblique collision.

A vehicle airbag device according to a first aspect of the present disclosure includes an inflator, an airbag, and a controlling portion. The inflator includes a first squib and a second squib. The inflator is configured to generate gas when the first squib and the second squib are fired. The airbag includes a main bag portion and a center bag portion. The main bag portion is configured to inflate and deploy between an occupant seated in a passenger seat and an instrument panel and between the occupant and a windshield when the gas generated by the inflator is supplied into the main bag portion. The main bag portion is placed in front of the occupant seated in the passenger seat in a state where the main bag portion inflates and deploys. The center bag portion is configured to project between the passenger seat and a driver seat from the main bag portion. The controlling portion is configured to control the inflator such that, when a head-on collision occurs, the second squib is fired after the first squib is fired, and when an oblique collision occurs, the second squib is fired after the first squib is fired and at a timing earlier than that when the head-on collision occurs.

According to the first aspect of the present disclosure, when a head-on collision occurs, the controlling portion controls the inflator such that the second squib is fired after the first squib is fired. Hereby, the inflator generates gas in response to the firing timing of the first squib and the firing timing of the second squib. Then, the airbag inflates as the gas generated by the inflator is supplied into the airbag. Hereby, an occupant can be restricted by the main bag portion of the airbag at the time of a head-on collision. When an oblique collision occurs, the controlling portion controls the inflator such that the second squib is fired after the first squib is fired. Hereby, the inflator generates gas in response to the firing timing of the first squib and the firing timing of the second squib. Then, the airbag inflates as the gas generated by the inflator is supplied into the airbag. Hereby, the occupant moving to a driver seat side at the time of an oblique collision toward the driver seat side can be restricted by the center bag portion and the main bag portion of the airbag. Here, the firing timing of the second squib at the time when an oblique collision occurs is earlier than the firing timing of the second squib at the time when a head-on collision occurs. Hereby, the gas is supplied from the inflator to the airbag more immediately at the time when the oblique collision occurs than the time when the head-on collision occurs, so that the time required until inflation and deployment of the airbag are completed at the time when the oblique collision occurs is shorter than the time required until inflation and deployment of the airbag are completed at the time when the head-on collision occurs. As a result, when an oblique collision occurs, the airbag can be immediately supported by the instrument panel and the windshield, thereby making it possible to restrain displacement of the airbag in the vehicle width direction.

In the first aspect, the controlling portion may be configured to control a timing to fire the second squib in accordance with build of the occupant seated in the passenger seat.

In the above aspect, the controlling portion may be configured such that, when the head-on collision occurs in a state where an occupant corresponding to an AF05 dummy or an occupant smaller than the AF05 dummy is seated in the passenger seat, the controlling portion controls the inflator such that the second squib is fired at a timing earlier than that when the head-on collision occurs in a state where an occupant corresponding to an AM50 dummy or an occupant larger than the AM50 dummy is seated in the passenger seat, wherein the AF05 dummy is a dummy for impact test for an American 5-percentile adult female in build, and the AM50 dummy is a dummy for impact test for an American 50-percentile adult male in build.

According to the above aspect, when a head-on collision occurs in a state where an occupant corresponding to the AF05 dummy for impact test or an occupant smaller than the AF05 dummy is seated in the passenger seat, the second squib is fired at a timing earlier than that when a head-on collision occurs in a state where an occupant corresponding to the AM50 dummy for impact test or an occupant larger than the AM50 dummy is seated in the passenger seat. Hereby, when a head-on collision occurs in the state where the occupant corresponding to the AF05 dummy for impact test or the occupant smaller than the AF05 dummy is seated in the passenger seat, inflation and deployment of the airbag are completed earlier than the time when a head-on collision occurs in the state where the occupant corresponding to the AM50 dummy for impact test or the occupant larger than the AM50 dummy is seated in the passenger seat. As a result, an occupant of small build (with a small mass) who easily moves forward in a head-on collision can be immediately restricted by the airbag.

In the above aspect, the controlling portion may be configured to control the inflator such that a timing to fire the second squib when the head-on collision occurs in a state where an occupant corresponding to an AF05 dummy or an occupant smaller than the AF05 dummy is seated in the passenger seat is the same as a timing to fire the second squib when the oblique collision occurs, the AF05 dummy being a dummy for impact test for an American 5-percentile adult female in build.

A control method in a second aspect of the present disclosure is a control method for the vehicle air bag device according to the first aspect. The control method includes, when the oblique collision occurs, firing the second squib after the first squib is fired and at a timing earlier than that when the head-on collision occurs.

In the second aspect, a timing to fire the second squib may be controlled in accordance with build of the occupant seated in the passenger seat.

In the above aspect, when the head-on collision occurs in a state where an occupant corresponding to an AF05 dummy or an occupant smaller than the AF055 dummy is seated in the passenger seat, the second squib may be fired at a timing earlier than that when the head-on collision occurs in a state where an occupant corresponding to an AM50 dummy or an occupant larger than the AM50 dummy is seated in the passenger seat, wherein the AF05 dummy being a dummy for impact test for an American 5-percentile adult female in build, and the AM50 dummy is a dummy for impact test for an American 50-percentile adult male in build.

In the above aspect, a timing to fire the second squib when the head-on collision occurs in a state where an occupant corresponding to an AF05 dummy or an occupant smaller than the AF05 dummy is seated in the passenger seat may be the same as a timing to fire the second squib when the oblique collision occurs, the AF05 dummy being a dummy for impact test for an American 5-percentile adult female in build.

A third aspect of the present disclosure relates to a non-transitory storage medium storing instructions that are executable by one or more processors and that cause one or more processors to perform a function of controlling the vehicle airbag device according to the first aspect. The function includes, when the oblique collision occurs, firing the second squib after the first squib is fired and at a timing earlier than that when the head-on collision occurs.

With each aspect of the present disclosure, it is possible to restrain displacement of the airbag in the vehicle width direction at the time of an oblique collision.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a view illustrating firing timings of squibs when a head-on collision occurs and when an oblique collision occurs.

DETAILED DESCRIPTION OF EMBODIMENTS

Figure 1:
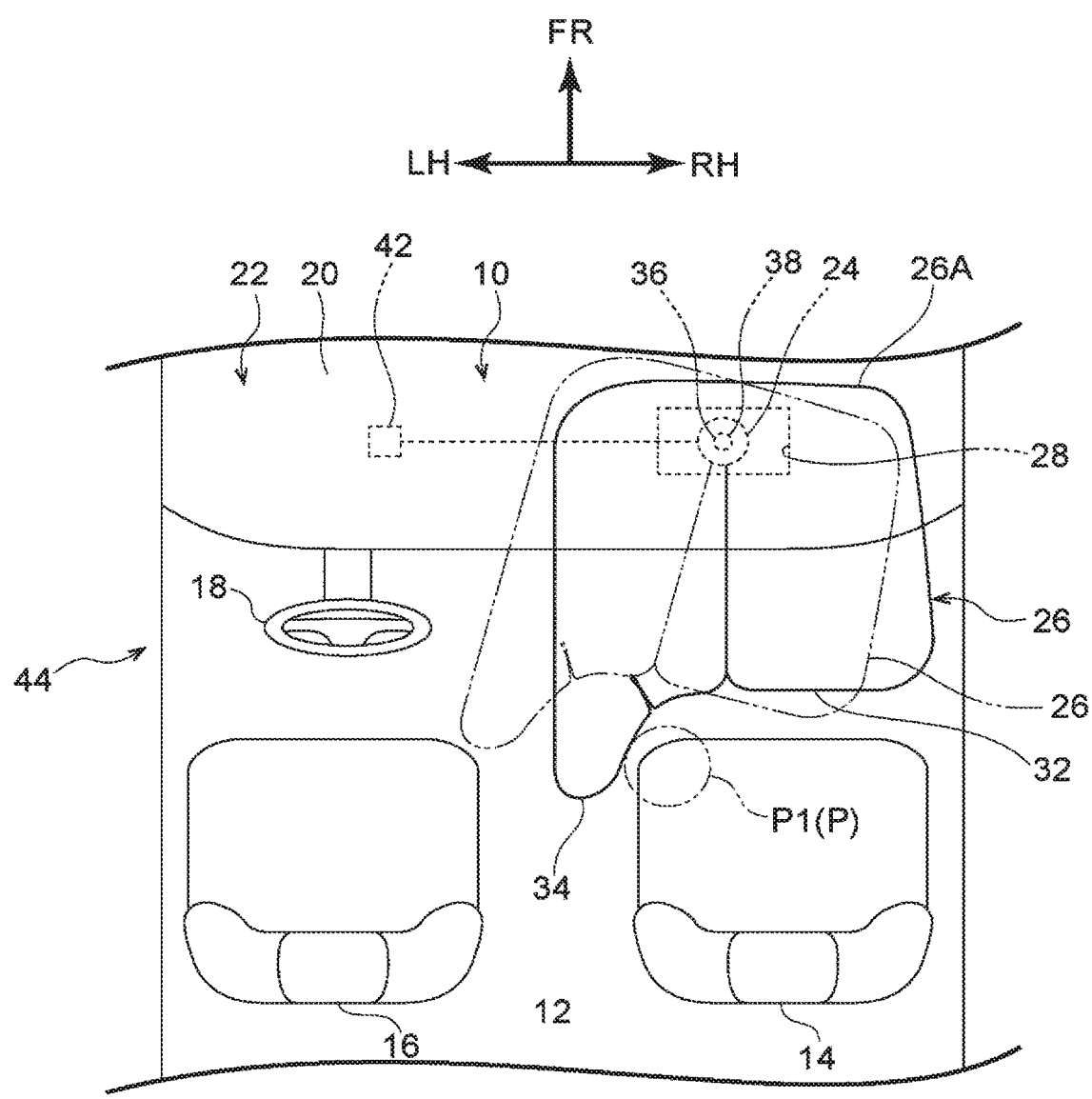
FIG. 1 is a plan view of a cabin of a vehicle that is viewed from the upper side, the vehicle including an airbag device of the present embodiment.
Figure 2:
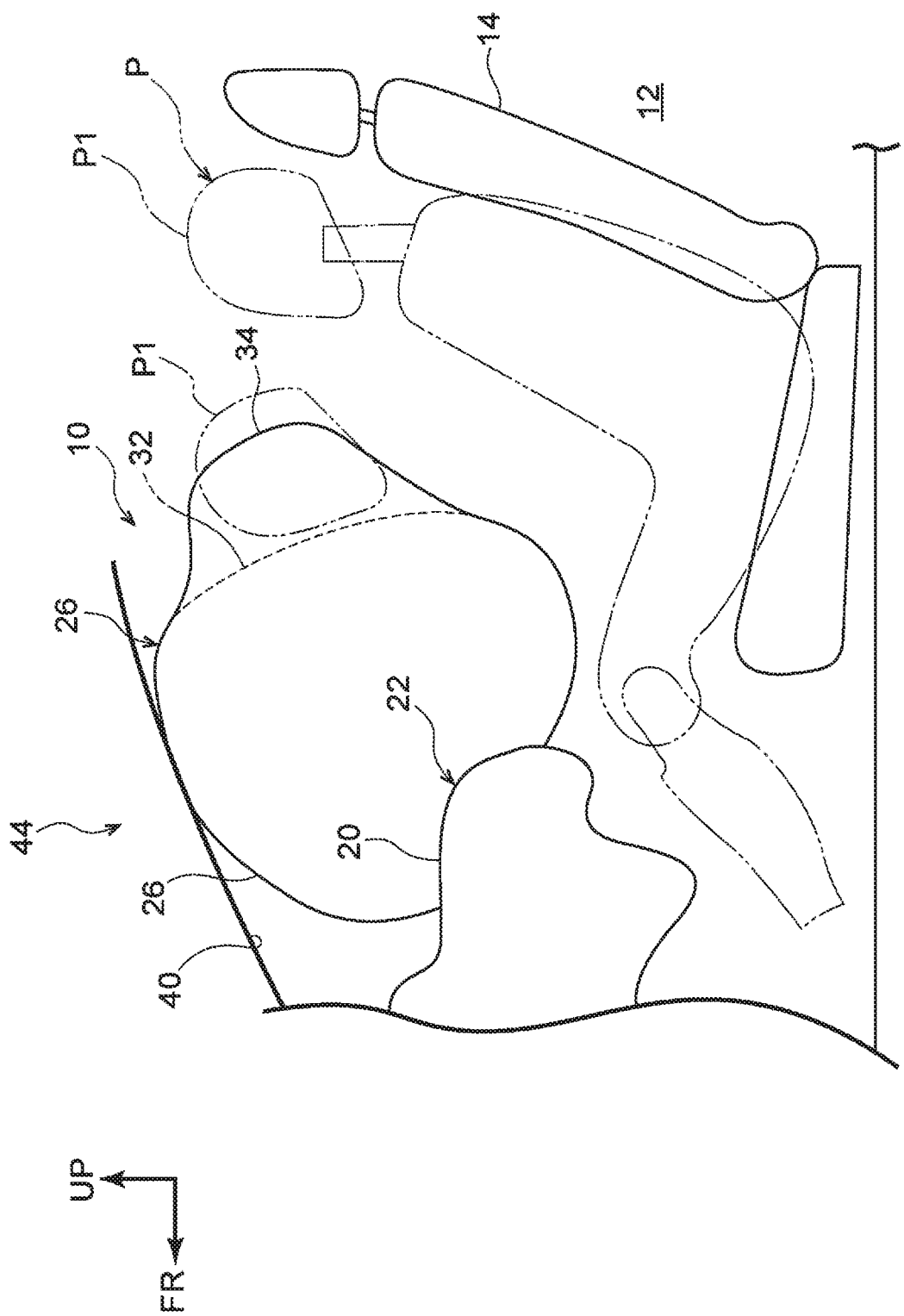
FIG. 2 is a side view of the cabin of the vehicle that is viewed from a driver seat side, the vehicle including the airbag device of the present embodiment.

The following describes a vehicle airbag device 10 according to an embodiment of the present disclosure with reference to FIGS. 1 to 3. Note that an arrow FR shown appropriately in each figure indicates the front side in the vehicle front-rear direction, an arrow UP indicates the upper side in the vehicle up-down direction, an arrow RH indicates the right side in the vehicle width direction, and an arrow LH indicates the left side in the vehicle width direction. Hereinafter, in a case where a description is made by use of merely front and rear directions, right and left directions, and up and down directions, they indicate front and rear in the vehicle front-rear direction, right and left in the vehicle right-left direction (the vehicle width direction), and up and down in the vehicle up-down direction, respectively, unless otherwise specified. Note that the present embodiment deals with a vehicle with left-hand drive as an example.

As illustrated in FIG. 1, the vehicle airbag device 10 of the present embodiment is provided in front of a passenger seat 14 provided on the right side in a cabin 12. Note that, in the following description, the "vehicle airbag device 10" is just referred to as an "airbag device 10." Further, a driver seat 16 is provided on the left side of the passenger seat 14 in the cabin 12. A vehicle is configured to travel when a steering wheel 18 and so on are operated by an occupant seated in the driver seat 16.

As illustrated in FIGS. 1 and 2, an instrument panel 22 including a top portion 20 extending in the front-rear direction and in the vehicle width direction is provided in front of the passenger seat 14 and the driver seat 16. The airbag device 10 of the present embodiment is provided inside the instrument panel 22. The airbag device 10 is configured to restrict an occupant seated in the passenger seat 14 at the time of a front collision of the vehicle.

The airbag device 10 includes: an inflator 24 configured to generate gas; an airbag 26 configured to inflate when the gas generated by the inflator 24 is supplied into the airbag 26; and an ECU 42 as a controlling portion configured to actuate the inflator 24. Further, the airbag device 10 includes: an airbag case 28 to which the inflator 24 is fixed and in which the airbag 26 before inflation is stored in a folded state; and an airbag door (not shown) configured to close an open end of the airbag case 28 on the cabin 12 side.

As illustrated in FIG. 1, the airbag 26 is formed in a pouched shape such that a fabric member is woven, a fabric member is joined by sewing, and the like. The airbag 26 includes: a main bag portion 32 having a rectangular-solid shape and configured to deploy toward the front side of the passenger seat 14; and a center bag portion 34 configured to project (stretch) rearward from an end portion of the main bag portion 32 on the left side (a central side in the vehicle width direction). In a state where deployment of the airbag 26 is completed, the center bag portion 34 is placed between the passenger seat 14 and the driver seat 16.

The airbag case 28 is provided inside the instrument panel 22 and is formed in a bottomed box shape such that the cabin 12 side of the airbag case 28 is opened. The inflator 24 configured to supply gas to the airbag 26 is fixed to the bottom of the airbag case 28 via a fastening member or the like.

The inflator 24 includes two squibs (a first squib 36 and a second squib 38), and thus, the inflator 24 is formed as a dual inflator in which a firing output is adjustable stepwise. Gas generation characteristics of the inflator 24 are adjustable by adjusting firing timings of the two squibs (the first squib 36 and the second squib 38). Further, the two squibs (the first squib 36 and the second squib 38) are electrically connected to the ECU 42 (described later).

The ECU 42 is constituted by a microcomputer including a central processing unit (CPU), a read only memory (ROM), a random access memory (RAM), and so on. A collision sensor (not shown) is electrically connected to the ECU 42. Further, based on information from the collision sensor, the ECU 42 can detect a front collision (occurrence or inevitability of the front collision) of each collision type to a vehicle 44 to which the airbag device 10 of the present embodiment is applied. When the CPU expands, in the RAM, a program stored in advance in the ROM and executes the program, the ECU 42 controls operations of the inflator 24 so as to control inflation and deployment of the airbag 26.

When the ECU 42 detects a collision based on information from the collision sensor, the ECU 42 fires the first squib 36 and the second squib 38 so that gas is generated from the inflator 24. Note that a collision type that causes the ECU 42 to actuate the inflator 24 includes a head-on collision that is a full overlap collision, an oblique collision that is a collision to a position offset on one side in the vehicle width direction, and so on. Accordingly, the ECU 42 detects which type a collision is, a head-on collision, an oblique collision, or other collisions, based on the information from the collision sensor.

Here, the oblique collision (MDB oblique impact) is, for example, a collision toward an obliquely front side as defined in NHTSA (as an example, a collision at a relative angle of 15° relative to a collision counterpart and with an overlap amount of about 35% in the vehicle width direction). The present embodiment assumes an oblique collision at a relative velocity of 90 km/h as an example.

In a case where the collision sensor is constituted by a plurality of sensors each configured to detect information on an acceleration caused by a collision, for example, the ECU 42 detects a front collision (occurrence or inevitability of the front collision) to the vehicle 44 and also detects which type the collision is, a head-on collision, an oblique collision, or other collisions based on pieces of information on an acceleration caused by the collision from the sensors.

FIG. 3 illustrates an example of a firing timing of each squib (the first squib 36 and the second squib 38) of the inflator 24 at the time of a head-on collision or an oblique collision.

When a vehicle collision as a head-on collision occurs at time 0 [ms], the first squib 36 is fired at time to fire (TTF) [ms]. Then, at TTF+x [ms], the second squib 38 is fired. At TTF+y1 [ms], inflation and deployment of the airbag 26 are completed. As an example, in the present embodiment, x is set to 25 [ms].

In the meantime, when an oblique collision (a collision to the driver seat 16 side of a front portion of the vehicle 44) occurs, the airbag 26 may be displaced (swung) to the driver seat 16 side due to inertia force of the airbag 26, as indicated by an alternate long and two short dashes line in FIG. 1. It is found from various collision tests that a displacement amount of the airbag 26 to the driver seat 16 side is larger as it takes longer time after the inflator 24 generates gas until inflation and deployment of the airbag 26 are completed. In view of this, in a case where an oblique collision occurs, the time required until the completion of inflation and deployment of the airbag 26 is shortened as compared with that in a case where a head-on collision occurs, so that a front side 26A of the airbag 26 is supported by the instrument panel 22 and a windshield 40. More specifically, in a case where a vehicle collision as an oblique collision occurs at time 0 [ms], the first squib 36 is fired at time to fire (TTF) [ms]. Then, at TTF+x−α that is a timing earlier than the timing at the time of a head-on collision, the second squib 38 is fired. At TTF+y2 [ms], inflation and deployment of the airbag 26 are completed. That is, inflation and deployment of the airbag 26 are completed at a timing earlier than that at the time of a head-on collision. As an example, in the present embodiment, x−α is set to 10 [ms] (α is set to 15 [ms]).

Operations and Effects of Present Embodiment

Operations and effects of the present embodiment are described below.

As illustrated in FIGS. 1 and 2, when the ECU 42 detects a collision based on information from the collision sensor at the time when the vehicle 44 provided with the airbag device 10 of the present embodiment travels, the first squib 36 and the second squib 38 are fired so that the inflator 24 generates gas.

Here, when the ECU 42 detects that the type of the collision to the vehicle 44 is a head-on collision, the ECU 42 fires the first squib 36. Further, the ECU 42 fires the second squib 38 after 25 [ms] from the firing timing of the first squib 36. In response to the firing timings of the first squib 36 and the second squib 38, the inflator 24 generates gas, so that the airbag 26 inflates and deploys. Hereby, an occupant P seated in the passenger seat 14 can be restricted by the main bag portion 32 of the airbag 26 at the time of a head-on collision.

Further, when the ECU 42 detects that the type of the collision to the vehicle 44 is an oblique collision (a collision to the driver seat 16 side of the front portion of the vehicle 44), the ECU 42 fires the first squib 36. Further, the ECU 42 fires the second squib 38 after 10 [ms] from the firing timing of the first squib 36. In response to the firing timings of the first squib 36 and the second squib 38, the inflator 24 generates gas, so that the airbag 26 inflates and deploys. Hereby, the occupant P (a head P1 of the occupant P) seated in the passenger seat 14 can be restricted by the center bag portion 34 of the airbag 26 at the time of an oblique collision.

Here, in the present embodiment, the firing timing of the second squib 38 at the time when an oblique collision occurs is 15 [ms] earlier than the firing timing of the second squib 38 at the time when a head-on collision occurs. Thus, the gas is supplied from the inflator 24 to the airbag 26 more immediately at the time when an oblique collision occurs than the time when a head-on collision occurs. Hereby, the time TTF+y2 [ms] that is required until the completion of inflation and deployment of the airbag 26 at the time when an oblique collision occurs is shorter than the time TTF+y1 [ms] that is required until the completion of inflation and deployment of the airbag at the time when a head-on collision occurs. As a result, at the time when an oblique collision occurs, the airbag 26 can be immediately supported by the instrument panel 22 and the windshield 40, thereby making it possible to restrain displacement of the airbag 26 in the vehicle width direction.

Note that the present embodiment deals with an example in which the second squib 38 is fired after 25 [ms] from the firing timing of the first squib 36 at the time of a head-on collision and the second squib 38 is fired after 10 [ms] from the firing timing of the first squib 36 at the time of an oblique collision. However, the present disclosure is not limited to this. The firing timing of the second squib 38 should be set appropriately in consideration of deceleration characteristics at the time of a collision along with a shape, structure, and so on of the vehicle 44.

Further, as illustrated in Table 1, the firing timing of the second squib 38 may be changed in accordance with the build of the occupant P seated in the passenger seat 14.

TABLE 1

| | | FIRING TIMING OF SECOND SQUIB | |
|---|---|---|---|
| | | FIRING TIMING AT HEAD-ON COLLISION x [ms] | FIRING TIMING AT OBLIQUE COLLISION x − α [ms] |
| BUILD OF OCCU- PANT | OCCUPANT EQUAL TO AM50 OR MORE | 25 | 10 |
| | SMALL OCCUPANT EQUAL TO AF05 OR LESS | 10 | 10 |

In this example, in a case where the vehicle 44 has a front collision in a state where an occupant corresponding to an AF05 dummy for impact test or an occupant smaller than the AF05 dummy is seated in the passenger seat 14, the second squib 38 is fired after 10 [ms] from the firing timing of the first squib 36 regardless of whether the collision is a head-on collision or an oblique collision.

Further, in a case where the vehicle 44 has a front collision in a state where an occupant P corresponding to an AM50 dummy for impact test or an occupant P larger than the AM50 dummy is seated in the passenger seat 14, the second squib 38 is fired after 25 [ms] from the firing timing of the first squib 36 at the time of a head-on collision, or the second squib 38 is fired after 10 [ms] from the firing timing of the first squib 36 at the time of an oblique collision. Note that the "dummy" as used herein is a human body dummy for a front collision test that is determined by standards [49 CFR Part 572 Subparts E and O] of National Highway Traffic Safety Administration (NHTSA). The AM50 dummy is a dummy of an American 50-percentile adult male in build, and the AF05 dummy is a dummy of an American 5-percentile adult female in build.

Further, a command to execute the function described in the above embodiment is stored in a non-transitory readable storage medium, and the function is implementable when one or more processors executes the command.

One embodiment of the present disclosure has been described above, but the present disclosure is not limited to the above description and may be modified in various ways to be performed other than the above description as long as the modifications are not beyond the gist of the present disclosure.

What is claimed is:

1. A vehicle airbag device comprising:
an inflator including a first squib and a second squib, the inflator being configured to generate gas when the first squib and the second squib are fired, respectively;
an airbag including
a main bag portion configured to inflate and deploy between an occupant seated in a passenger seat and an instrument panel and between the occupant and a windshield when the gas generated by the inflator is supplied into the main bag portion, and be placed in front of the occupant seated in the passenger seat in a state where the main bag portion inflates and deploys, and
a center bag portion configured to project between the passenger seat and a driver seat from the main bag portion; and
a controlling portion configured to control the inflator such that, when a head-on collision occurs, the second squib is fired after the first squib is fired, and when an oblique collision occurs, the second squib is fired after the first squib is fired and at a timing earlier than that when the head-on collision occurs.

2. The vehicle airbag device according to claim 1, wherein the controlling portion configured to control a timing to fire the second squib in accordance with build of the occupant seated in the passenger seat.

3. The vehicle airbag device according to claim 2, wherein, the controlling portion is configured such that, when the head-on collision occurs in a state where an occupant corresponding to an AF05 dummy or an occupant smaller than the AF05 dummy is seated in the passenger seat, the controlling portion controls the inflator such that the second squib is fired at a timing earlier than that when the head-on collision occurs in a state where an occupant corresponding to an AM50 dummy or an occupant larger than the AM50 dummy is seated in the passenger seat, wherein the AF05 dummy is a dummy for impact test for an American 5-percentile adult female in build, and the AM50 dummy is a dummy for impact test for an American 50-percentile adult male in build.

4. A control method for the vehicle airbag device according to claim 1, the control method comprising, when the oblique collision occurs, firing the second squib after the first squib is fired and at a timing earlier than that when the head-on collision occurs.

5. The control method according to claim 4, wherein a timing to fire the second squib is controlled in accordance with build of the occupant seated in the passenger seat.

6. The control method according to claim 5, wherein, when the head-on collision occurs in a state where an occupant corresponding to an AF05 dummy or an occupant smaller than the AF05 dummy is seated in the passenger seat, the second squib is fired at a timing earlier than that when the head-on collision occurs in a state where an occupant corresponding to an AM50 dummy or an occupant larger than the AM50 dummy is seated in the passenger seat, wherein the AF05 dummy is a dummy for impact test for an American 5-percentile adult female in build, and the AM50 dummy is a dummy for impact test for an American 50-percentile adult male in build.

7. A non-transitory storage medium storing instructions that are executable by one or more processors and that cause one or more processors to perform a function of controlling the vehicle airbag device according to claim 1, the function comprising, when the oblique collision occurs, firing the second squib after the first squib is fired and at a timing earlier than that when the head-on collision occurs.

8. A vehicle airbag device, comprising:
an inflator including a first squib and a second squib, the inflator being configured to generate gas when the first squib and the second squib are fired, respectively;

an airbag including
- a main bag portion configured to inflate and deploy between an occupant seated in a passenger seat and an instrument panel and between the occupant and a windshield when the gas generated by the inflator is supplied into the main bag portion, and be placed in front of the occupant seated in the passenger seat in a state where the main bag portion inflates and deploys, and
- a center bag portion configured to project between the passenger seat and a driver seat from the main bag portion; and
- a controlling portion configured to control the inflator such that a timing to fire the second squib is in accordance with build of the occupant seated in the passenger seat, the controlling portion controls the inflator such that, when a head-on collision occurs, the second squib is fired after the first squib is fired and when an oblique collision occurs, the second squib is fired after the first squib is fired, the controlling portion controls the inflator such that a timing to fire the second squib when the head-on collision occurs in a state where an occupant corresponding to an AF05 dummy or an occupant smaller than the AF05 dummy is seated in the passenger seat is the same as a timing to fire the second squib when the oblique collision occurs, the AF05 dummy being a dummy for impact test for an American 5-percentile adult female in build.

9. A control method for a vehicle airbag device the vehicle air bag including:
- an inflator including a first squib and a second squib, the inflator being configured to generate gas when the first squib and the second squib are fired, respectively; and
- an airbag including:
  - a main bag portion configured to inflate and deploy between an occupant seated in a passenger seat and an instrument panel and between the occupant and a windshield when the gas generated by the inflator is supplied into the main bag portion, and be placed in front of the occupant seated in the passenger seat in a state where the main bag portion inflates and deploys, and
  - a center bag portion configured to project between the passenger seat and a driver seat from the main bag portion, the control method comprising:
controlling timings of firing the first squib and the second squib by the inflator in accordance with build of the occupant seated in the passenger seat, such that, when a head-on collision occurs, the second squib is fired after the first squib is fired and when an oblique collisions occurs, the second squib is fired after the first squib is fired,
wherein a timing to fire the second squib when the head-on collision occurs in a state where an occupant corresponding to an AF05 dummy or an occupant smaller than the AF05 dummy is seated in the passenger seat is the same as a timing to fire the second squib when the oblique collision occurs, the AF05 dummy being a dummy for impact test for an American 5-percentile adult female in build.

* * * * *